(12) United States Patent
Asgekar et al.

(10) Patent No.: US 9,026,537 B1
(45) Date of Patent: May 5, 2015

(54) SOCIAL NETWORK NODE CLUSTERING SYSTEM AND METHOD

(71) Applicant: Google Inc., Mountain View, CA (US)

(72) Inventors: Amogh Asgekar, Mumbai (IN); Sandesh Tawari, Bangalore (IN)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/087,969

(22) Filed: Nov. 22, 2013

Related U.S. Application Data

(63) Continuation of application No. 12/882,441, filed on Sep. 15, 2010, now Pat. No. 8,606,787.

(51) Int. Cl.
 G06F 17/30 (2006.01)
 G06F 7/00 (2006.01)

(52) U.S. Cl.
 CPC .............................. G06F 17/30598 (2013.01)

(58) Field of Classification Search
 CPC .................................................. G06F 17/3071
 USPC ............................ 707/737, 999.002; 709/223
 See application file for complete search history.

(56) References Cited

U.S. PATENT DOCUMENTS

| | | | |
|---|---|---|---|
| 6,073,138 A | 6/2000 | de l'Etraz et al. | |
| 6,130,938 A | 10/2000 | Erb | |
| 6,192,119 B1 | 2/2001 | Wilson | |
| 6,594,673 B1 | 7/2003 | Smith | |
| 6,658,423 B1 | 12/2003 | Pugh | |
| 6,697,478 B1 | 2/2004 | Meldrum et al. | |
| 6,754,322 B1 | 6/2004 | Bushnell | |
| 7,069,308 B2 | 6/2006 | Abrams | |
| 7,092,821 B2 | 8/2006 | Mizrahi et al. | |
| 7,106,848 B1 | 9/2006 | Barlow et al. | |
| 7,117,254 B2 | 10/2006 | Lunt et al. | |
| 7,188,153 B2 | 3/2007 | Lunt | |
| 7,269,590 B2 | 9/2007 | Hull | |
| 7,366,990 B2 | 4/2008 | Pitroda | |
| 7,478,078 B2 | 1/2009 | Lunt | |
| 7,555,110 B2 | 6/2009 | Dolan et al. | |
| 7,610,287 B1 | 10/2009 | Dean et al. | |
| 7,742,468 B2 | 6/2010 | Vagelos | |
| 7,889,679 B2 * | 2/2011 | Canright et al. | ............... 370/254 |
| 8,000,262 B2 * | 8/2011 | Leighton et al. | ............... 370/254 |
| 8,606,787 B1 * | 12/2013 | Asgekar et al. | ............... 707/737 |

(Continued)

FOREIGN PATENT DOCUMENTS

| | | |
|---|---|---|
| JP | 11265369 | 9/1999 |
| WO | WO02079984 | 10/2002 |

OTHER PUBLICATIONS

Lance, G.N., et al., "Computer Programs for Hierarchical Polythetic Classification ("similarity analyses")", The Computer Journal, C.S.I.R.O. Computing Research Section, dated May 1966, 7 pages, vol. 9.

(Continued)

Primary Examiner — Jean M Corrielus
(74) Attorney, Agent, or Firm — Patent Law Works LLP

(57) ABSTRACT

Users in a social network are represented by nodes on a network graph. A similarity processor generates a similarity matrix of nodes and neighbors. A clustering processor groups select nodes based on similarity. Nodes initially assigned to one cluster are selectively added to other clusters based on similarity. A social network processor provides features and processing based on the clusters of nodes thus produced.

21 Claims, 6 Drawing Sheets

(56) References Cited

U.S. PATENT DOCUMENTS

| | | |
|---|---|---|
| 2002/0103682 A1 | 8/2002 | Stemmer |
| 2002/0137490 A1 | 9/2002 | Gallant |
| 2002/0143874 A1 | 10/2002 | Marquette et al. |
| 2003/0083898 A1 | 5/2003 | Wick |
| 2004/0122681 A1 | 6/2004 | Ruvolo et al. |
| 2004/0122803 A1 | 6/2004 | Dom |
| 2004/0162830 A1 | 8/2004 | Shirwadkar et al. |
| 2004/0258220 A1 | 12/2004 | Levine et al. |
| 2005/0021750 A1 | 1/2005 | Abrams |
| 2005/0050158 A1 | 3/2005 | Solari |
| 2005/0152521 A1 | 7/2005 | Liljestrand |
| 2005/0165785 A1 | 7/2005 | Malkin et al. |
| 2005/0171832 A1 | 8/2005 | Hull |
| 2005/0209999 A1 | 9/2005 | Jou |
| 2005/0210409 A1 | 9/2005 | Jou |
| 2005/0246420 A1 | 11/2005 | Little |
| 2005/0267940 A1 | 12/2005 | Galbreath |
| 2006/0026288 A1 | 2/2006 | Acharya et al. |
| 2006/0077957 A1 | 4/2006 | Reddy et al. |
| 2006/0136419 A1 | 6/2006 | Brydon et al. |
| 2006/0206604 A1 | 9/2006 | O'Neil et al. |
| 2007/0127631 A1 | 6/2007 | Difiglia |
| 2007/0168533 A1* | 7/2007 | Canright et al. ............. 709/230 |
| 2007/0171898 A1 | 7/2007 | Salva |
| 2007/0173236 A1 | 7/2007 | Vishwanathan et al. |
| 2007/0248077 A1 | 10/2007 | Mahle, Jr. et al. |
| 2008/0056475 A1 | 3/2008 | Brannick et al. |
| 2008/0126523 A1* | 5/2008 | Tantrum et al. ............. 709/223 |
| 2008/0133716 A1 | 6/2008 | Rao et al. |
| 2008/0192656 A1 | 8/2008 | Vagelos |
| 2009/0013386 A1 | 1/2009 | Puthenkulam et al. |
| 2009/0252046 A1* | 10/2009 | Canright et al. ............. 370/250 |
| 2009/0262664 A1* | 10/2009 | Leighton et al. ............. 370/254 |
| 2011/0098156 A1 | 4/2011 | Ng et al. |
| 2012/0001919 A1* | 1/2012 | Lumer ......................... 345/440 |

OTHER PUBLICATIONS

Lance, G.N., et al., "A Generalized Sorting Strategy for Computer Classifications," Nature, dated Oct. 8, 1966, 1 page, vol. 212.

Lance, G.N., et al., "A General Theory of Classificatory Sorting Strategies 1. Hierarchical Systems," The Computer Journal, C.S.I.R.O. Computing Research Section, dated 1967, 8 pages, vol. 9, No. 4.

Lance, G.N., et al., "Mixed-Data Classificatory Programs I, Agglomerative Systems," Austral., Comput. J., dated 1967, 1 page, vol. 1.

Milligan, G., "Ultrametric hierarchical Clustering Algorithms," Psychometrika, dated Sep. 1979, 4 pages, vol. 1.

Tan, P.-N., et al., "Introduction to Data Mining," Chapter 8 Cluster Analysis: Basic Concepts and Algorithms (Section 8.3.3—The Lance-Wiliams Formula for Cluster Proximity, p. 524) dated 2006, 82 pages.

Adamic et al., "A Social Network Caught in the Web," Internet Journal, First Monday, Jun. 2, 2003, vol. 8, No. 6, pp. 1-22.

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always On" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, London, United Kingdom, pp. 252-255.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873, 23 pgs.

Heer et al., "Vizster: Visualizing Online Social Networks," University of California, Berkeley, Oct. 23, 2005, 8 pgs.

International Search Report, International Application No. PCT/US2008/005118, Sep. 30, 2008, 2 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, [Retrieved on May 13, 2011], 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

O'Murchu et al., "Online Social and Business Networking Communities," Digital Enterprise Research Institute DeERI Technical Report, National University of Ireland, Aug. 11, 2004, 22 pgs.

Ring Central, Inc., Internet, retrieved at http://www.ringcentral.com, Apr. 19, 2007, 1 pg.

Singh et al., "CINEMA: Columbia InterNet Extensible Multimedia Architecture," Department of Computer Science, Columbia University, Apr. 26, 2002, pp. 1-83.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, retrieved at http://blog.superfeedr.com/track/filter/xmpp/pubsubhubbub/track, May 13, 2011, 8 pgs.

Twitter Blog: Tracking Twitter, Internet, retrieved at http://blog.twitter.com/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

\* cited by examiner

SOCIAL NETWORK NODE CLUSTERING SYSTEM AND METHOD

CROSS REFERENCE TO RELATED APPLICATIONS

This application is a continuation of and claims priority to U.S. patent application Ser. No. 12/882,441, now U.S. Pat. No. 8,606,787, filed Sep. 15, 2010, titled "Social Network Node Clustering System and Method", which is incorporated herein by reference in its entirety.

BACKGROUND

1. Field of the Invention

This invention relates to electronic communications and, in particular, computer-implemented systems and methods to support large social networks.

2. Description of the Related Art

The sharing of information among users of social networks has developed into a worldwide phenomenon, supported by various different social network facilities. Millions of text, picture, video and audio communications are sent and received on a daily basis among users of such networks.

The various relationships among users, or profiles, on such networks are typically represented by social graphs. As the use of social networks has become more widespread, these social graphs have become structures of immense size and complexity.

In social network applications, it is often desirable to determine certain relationships between profiles and to group certain profiles together. Not only can it be helpful to determine which profiles are directly connected to one another, it can also be beneficial to determine which profiles are indirectly connected within a certain number of adjacent vertices. For example, it may be important for purposes of allowing access between two social network users to determine that they are fairly closely connected, e.g. one has a friend whose friend is also a friend of the other. Still further, it may be desirable to group certain profiles together in a manner that is meaningful to a particular profile (or user). Some relationships are more meaningful to a user than others. For example, a person who works in an office may want to know which other people in the office are friends of his own office friends, but he may be less interested in people outside the office who are friends of his office friends. Even though both types of people have the same degree of separation, only the office friends may be appropriately considered implicit neighbors. Likewise, someone in an office might like to have a simple way to automatically send information to all of his friends who also work in his office. With large social networks, determining such neighbors on a social graph can be an extremely difficult problem that requires significant processor overhead.

Historically, there has been relatively little work done on clustering users, or nodes, in a social graph. Known clustering techniques from web graphs and citation graphs address different problems and are not necessarily well suited to addressing social graphs. One specific challenge is that noise, in the form of trivial nodes that do not fall into any particular cluster, tends to reduce scalability in attempts to identify and process clusters. Eigen value decomposition methods that might address noisy data typically require a bound on the number of clusters to be processed and therefore do not lend themselves to scalable solutions very well, at least without approximations or message passing among different threads that would impose undesirable overhead in the processing.

Other techniques, such as clustering based on Jaccard similarity or variations of TF-IDF (term frequency-inverse document frequency) are not desirable approaches either, because the problems they attempt to solve do not share certain characteristics with social graphs. For instance, document similarity processing relies on certain similarities in neighbors that is not commonly present in social graphs. Likewise, similarity of documents is invariant to the size of the documents themselves and depends on ratios, such that two documents of size 3 (words, for instance) and 2 overlapping words will be analyzed the same as two documents of size 30 words with 20 overlapping.

As a result of these challenges, there remains a need for a system and method that can more efficiently determine such near neighbors on a social graph to allow continued usability of extremely large social network systems without requiring inordinately large processor systems and the accompanying energy use of such systems. With such a system and method, certain groupings of a user's friends can be made automatically to allow communications and general information sharing with the most relevant subset of the user's connections.

SUMMARY

Various systems, methods and software tools, in various embodiments, allow near neighbors in a social network to be identified for further processing (i.e., to allow access permissions, auto-grouping, or recommendations) by first finding local clusters in the immediate vicinity of a user, and then expanding such local clusters to find global clusters.

A similarity metric is employed based on the number of neighbors that two nodes have in common. However, rather than examining each neighbor of one node to determine whether it is a neighbor of the other, an inverted index is formed showing for each neighbor, the nodes connected to that neighbor. From a processing perspective, this allows strong efficiencies as neighbors having no more than one connection can be immediately ignored, and in practice such trivial nodes are found to represent most of the nodes under consideration. Because of this, at a practical level processing complexity is found to be reduced significantly.

Once common neighbors are identified, a corresponding similarity matrix is provided as input to a clustering algorithm that forms and combines clusters based on similarity up to a predetermined metric. Next, a "soft" clustering stage adds nodes to clusters if a similarity between that node and that cluster exceeds a certain similarity based on a cluster-to-cluster similarity approach. Advantageously, particularly for large graphs, there is no initial need to cluster an entire large graph at once, but instead smaller portions are incrementally grouped into clusters in a manner that lends itself readily to parallel processing since the focus is on local rather than global features of the social graph. Since social graphs are typically local in nature, such an approach is found in practice to be quite efficient.

One skilled in the art will readily recognize from the following discussion that alternative embodiments of the structures and methods illustrated herein may be employed without departing from the principles of the invention described herein.

DETAILED DESCRIPTION OF THE EMBODIMENTS

System Overview

Embodiments of the present invention provide systems, methods, and computer-readable storage media for identifying near neighbors or nodes, or users, in social network facilities and other modes of electronic communication. Just as in human physical interaction, users of social networks and other forms of electronic communication often wish to take certain actions, such as sharing information, with only certain groups of people having a particular relationship with them, but not others. A person may wish to share one news story only with office colleagues, for instance, while sharing another news story only with old college friends. With large social networks having many millions of nodes, it can be extremely processor-intensive to identify all of a user's groups of interest, even when those are selected from only the near neighbors in a social network.

Figure 1:
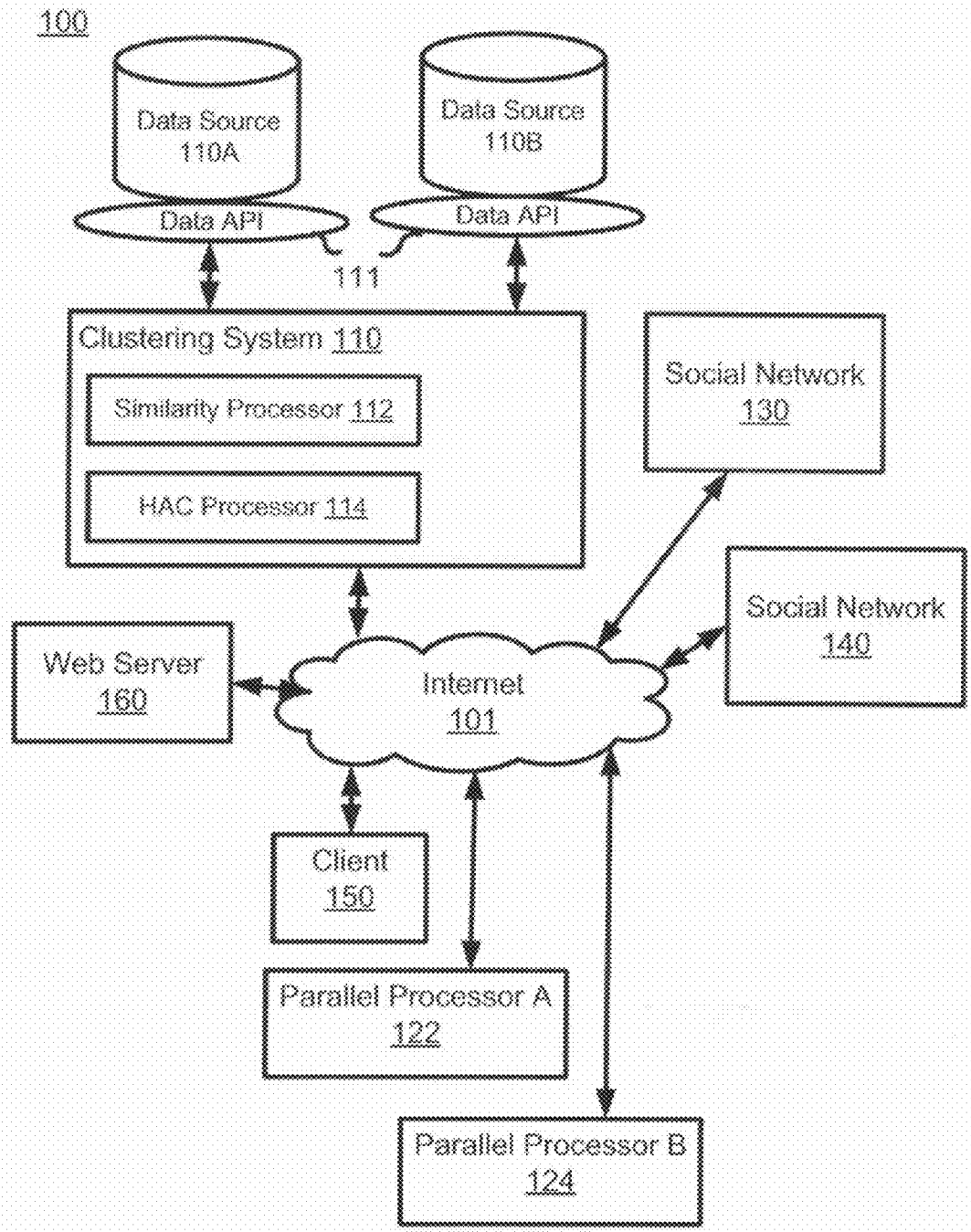
FIG. 1 is a high-level block diagram of a computing environment in accordance with one embodiment.

FIG. 1 is an illustration of a computing environment 100 in accordance with one embodiment of the invention. The computing environment 100 includes a variety of data sources 110A, 110B, a clustering system 110, social networks 130 and 140, a user's own web server 160, a client 150 connected via the Internet 101, and parallel processors A and B 122, 124.

The data sources 110A, 110B are data stores that maintain information about relationships in a social network. In one embodiment, the data sources 110A, 110B keep information about certain clusters of nodes, such as near neighbors in a social network. While two such data sources 110A and 110B are shown, any number can be used as desired or as appropriate for a particular environment 100. For example, data source 110A in one embodiment stores a complete node map for a social network, while data source 110B stores previously determined cluster information. Data APIs are shown as being associated with each of sources 110A and 110B to allow a variety of data sources to be adapted for use in environment 100. These APIs may be omitted in implementations that use only fully integrated data sources.

The clustering system 110 includes similarity processor 112 and HAC processor 114. Similarity processor 112 is a computer-implemented subsystem configured to accept as input two nodes, e.g., two profiles representing two users of a social network, to produce from that input a measure of similarity based on common neighbors of the two nodes. In one embodiment similarity processor 112 produces a similarity matrix as detailed below. HAC processor 112, also a computer-implemented subsystem, is configured to take the output of similarity processor 112 and use a form of hierarchical agglomerative clustering to generate from the similarity measure clusters of nodes that are related above some selected level. Details of the specific manner of operation of processors 112 and 114 are provided below.

Social networks 130 and 140 represent social networking facilities such as the orkut social network facility provided by Google Inc. More than one such network is illustrated because in one embodiment, environment 100 allows processing for multiple social networks. Facilities such as Gmail (including its Google Buzz facility) and Google Talk, are other examples of facilities on which processing can be performed as described herein. As illustrated in FIG. 1, social networks 130 and 140 communicate via the Internet 101 with clustering system 110 and associated data sources 110A and 110B. However, in various embodiments, components 110, 110A, 110B are implemented in whole or in part directly in a social network, e.g., 130.

Also shown in FIG. 1 are four other computing systems, namely web server 160, client 150, parallel processor A 122 and parallel processor B 124. As discussed below, processing for clustering system 110 is configured so that certain tasks performed, e.g., by similarity processor 112 and HAC processor 114, can also be performed in whole or in part by other processors that may be available for use in environment 100. A user's own web server 160 and client 150 are two examples of such processors. Other processors made available for cluster-related processing in environment 100 are represented by parallel processors A and B, 122, 124. In typical environments, some processors will be better practical choices for processing as described herein than others. For example, use of a user's web server 160 may require sending the user's entire list of friends every time the user is to be clustered in a group (i.e., for each friend that he has). Therefore, practical considerations may favor use of certain available processors over others, but processing as described below can nonetheless be parallelized in any manner appropriate for a given environment.

Figure 2:
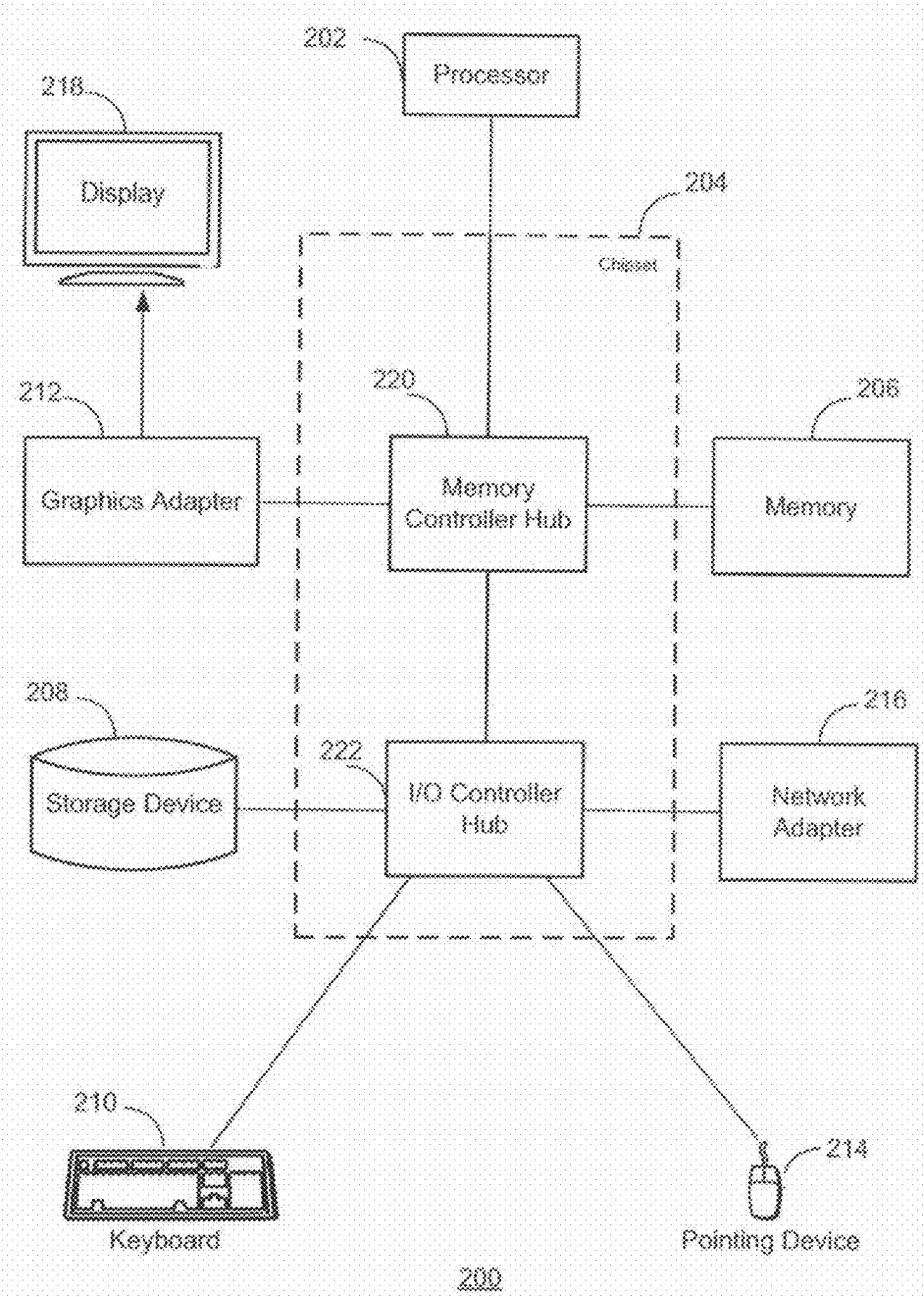
FIG. 2 is a high-level block diagram illustrating an example of a computer for use as a server and/or client.

FIG. 2 is a high-level block diagram illustrating an example of a computer 200 for use as a data source 110A, 110B, a clustering system 110 (including its component similarity processor 112 and HAC processor 114), social networks 130, 140, a web server 160, a client 150, and/or parallel processors A and B 122, 124. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a computer-readable storage medium such as a hard drive, compact disc read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display device 218. The network adapter 216 couples the computer system 200 to the Internet 101. Some embodiments of the computer 200 have different and/or other components than those shown in FIG. 2.

The computer 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

The types of computers 200 used by the components of FIG. 1 vary depending upon the embodiment and the processing power used by the entity. For example, a client 150 that is a mobile telephone typically has limited processing power, a small display 218, and might lack a pointing device 214. The clustering system 110, in contrast, may comprise multiple blade servers working together to provide the functionality described herein.

Determining Clusters

Figure 3:
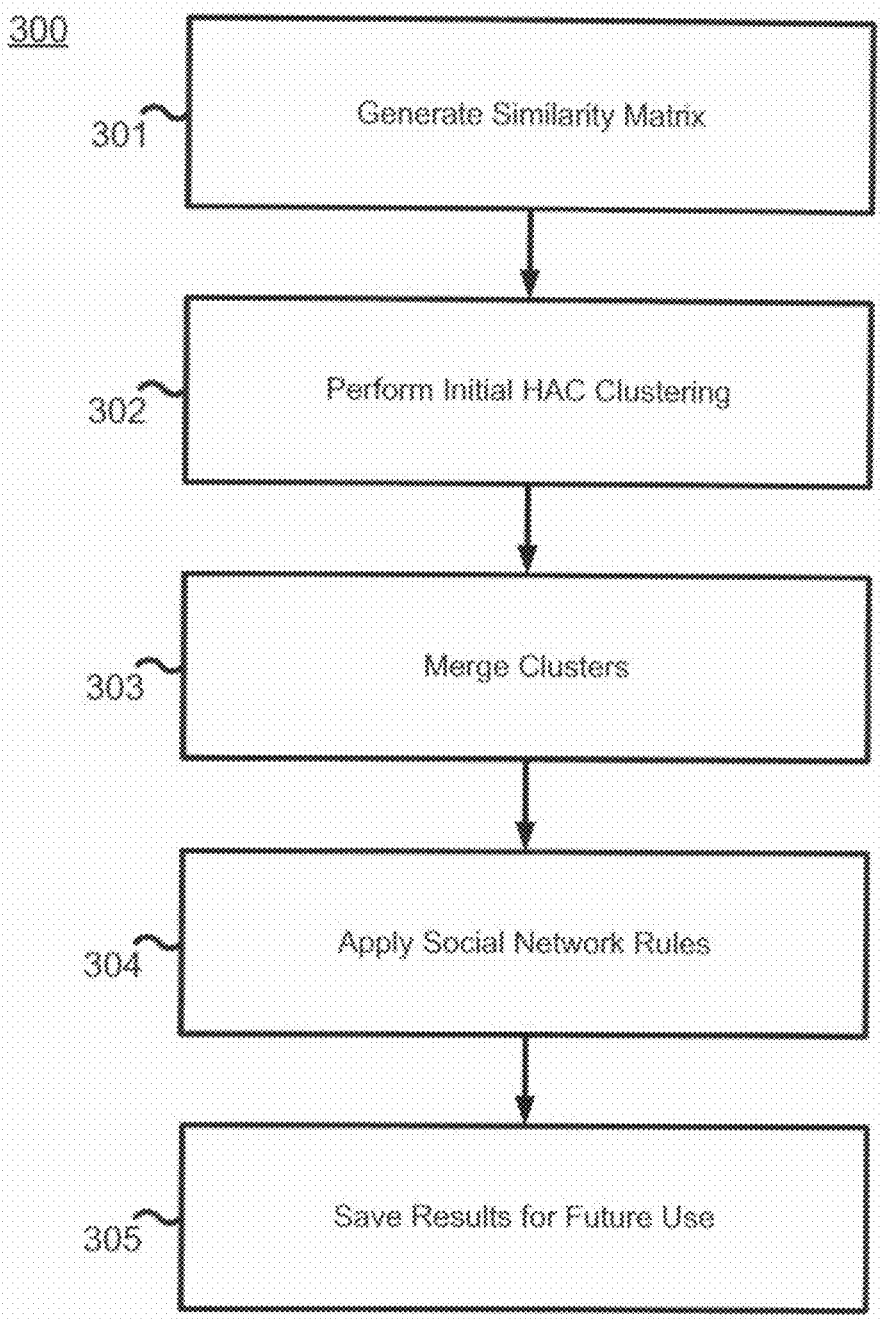
FIG. 3 is a flow chart illustrating a method of cluster processing, in accordance with one embodiment.

FIG. 3 is a flow chart illustrating an example method 300 of determining clusters. In step 301, similarity processor 112 generates a similarity matrix. As noted above, known document clustering systems make use of Jaccard similarity or variations of TF-IDF, but these similarity measures for documents may not apply well in social network applications. Unlike documents, people in the same cluster may well not have all or even most of their neighbors in common. Likewise, Jaccard analysis would consider similarity of two documents of size 3 each with 2 overlapping words to be equivalent to that of two documents of size 30 with 20 overlapping words (because Jaccard similarity uses the measure $|A \cap B|/|A \cup B|$), but this approach is not particularly helpful in considering profiles of people in a social network.

Figure 4:
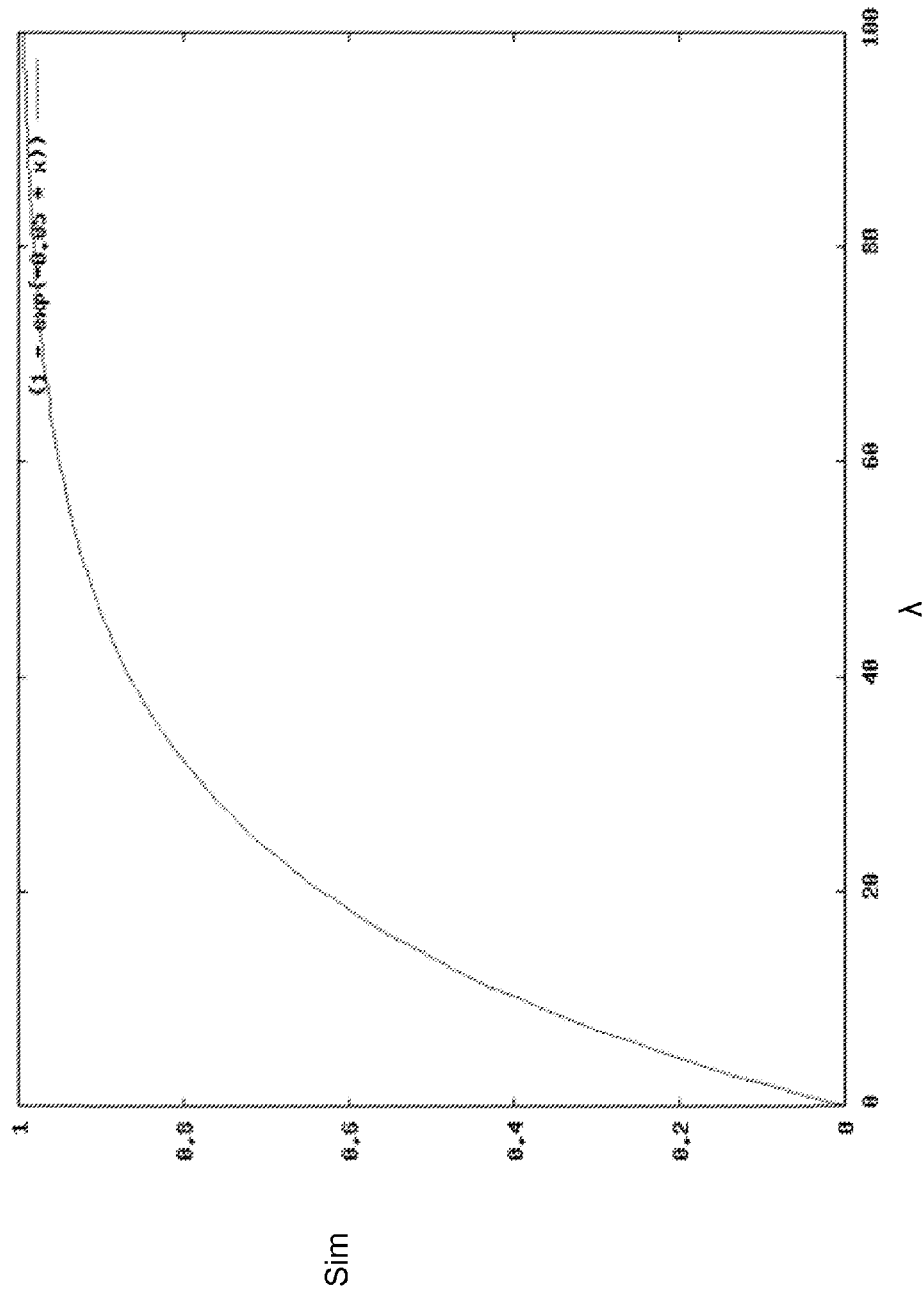
FIG. 4 is a graph of a similarity function, in accordance with one embodiment.

Instead, similarity processor 112 defines a measure of similarity to be: $\text{sim}(A, B) = 1 - \exp(-k/\lambda)$. Here k is the number of common neighbors, or nodes in the social graph that are directly connected (i.e., explicit friends who are connected by a single one hop in the graph), and $\lambda$ is a graph-specific decay parameter that is tuned based on the number of intersecting neighbors. A higher value of $\lambda$ spreads out the similarity score over a larger number of common friends, while smaller values do the reverse. Referring now also to FIG. 4, graph 400 illustrates the similarity function varying with the number of intersecting neighbors with a value of $\lambda$ set at 20; this value is found to be suited for certain large social networks. Based on such a measure, processing to produce a similarity matrix can be performed by obtaining a neighbor list for each node and then iterating the following over all pairs of nodes: For each pair of nodes (U1 and U2) work through one list (e.g., the list for U1) and find the intersection with the other (the list for U2). Those skilled in the art will recognize that the complexity of the above computation becomes $O(k*N^2)$ where N is number of neighbors of the node and k is the average number of friends (or "links", when considered from the perspective of the corresponding social graph). In practical application on a large commercially implemented social network, N is found to be on an average close to 100-150 and generally no more than 1000. Under such circumstances an $O(N^3)$ would be computationally extremely inefficient. Similarity processor 112 avoids this problem by exploiting an interesting property of the neighbor lists. Each neighbor list comes from a space of K uniquely identifiable nodes. Yet, only a small fraction of them occur in most of the neighbor lists. The rest are sparsely distributed. Many of the nodes that are not relevant for clustering purpose are those that are two or more hops away from the node under consideration and fall on a single link. Such nodes are not considered for clustering by HAC processor 114 as detailed below and can therefore be ignored as trivial for the sake of computing similarity. To avoid processing trivial nodes, the neighbor list is converted into an inverted index as exemplified below, where A, B, C represent the nodes of immediate interest and U1, U2, U3, U5, U7, U8, U9 represent neighbors of at least one of nodes A, B, C.

| Neighbor List | Inverted Index |
| --- | --- |
| A -> U1, U2, U3, U5 | U1 -> A, C |
| B -> U2, U3, U7, U8 | U2 -> A, B, C |
| C -> U1, U2, U3, U9 | U3 -> A, B, C |
| | U5 -> A |
| | U7 -> B |
| | U8 -> B |
| | U9 -> C |

As can be seen, using the inverted index rather than the original neighbor list, for purposes of further processing there are only two rows of three items each and one row of two items needed, rather than three rows of four items each. This approach is found to cut the processing overhead for similarity processor 112 significantly, and those of skill in the art will recognize that the use of the inverted index allows processing in upper bound $O(N^2)$ time. Practical processing time is significantly less, on the order of $O(Nk^2)$, since it is found in operation with an actual social network that most of the rows will be like the rows for U5, U7, U8 and U9 and have only a single element. Such rows can be ignored for further processing.

Figure 5:
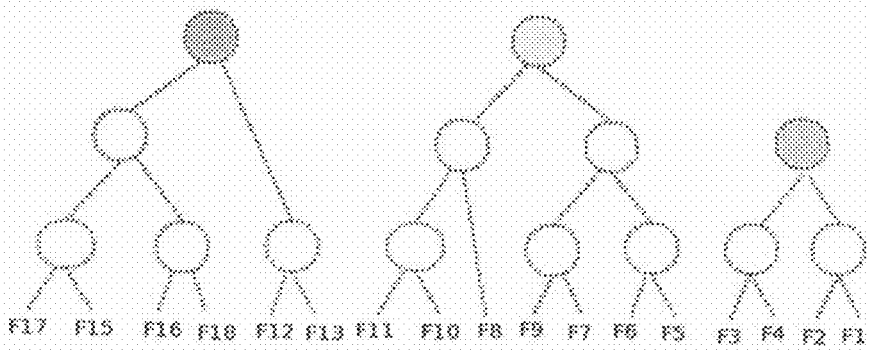
FIG. 5 is a dendogram illustrating the result of HAC processing, in accordance with one embodiment.

In step 302, the similarity matrix is input to HAC processor 114, which uses a hierarchical agglomerative clustering algorithm to determine near neighbors. Specifically, HAC processor 114 processes the similarity matrix by initially assigning every node to a singleton cluster. A determination is then made as to which two clusters have the maximum similarity, based on Lance-Williams similarity update processing described below. Those two maximally similar clusters are then replaced by a combined cluster. The process is then iterated, and continues until no pair of clusters remains having a similarity measure above a selected level. Referring now also to FIG. 5, in one embodiment, HAC processor 114 produces a dendogram 500 in the course of its processing to keep track of the progress of cluster processing. As illustrated in FIG. 5, individual nodes (or friends) F1-F18 undergo three levels of clustering before final clusters 5201, 5301 and 5302 are obtained. First, clusters 5101-5108 are generated, then 5201-5204, and finally 5301-5302. Those skilled in the art will recognize that an advantage of this manner of processing is that it is not based on providing any certain number or size of clusters as the output, but instead terminates processing based on a level of similarity. For purposes of clustering social network user profiles, this is found to provide a more desirable tradeoff between processing overhead and usability of results than, for example, a fixed number of clusters might provide. This is particularly so in situations exhibiting significant background noise, such as large numbers of nodes that turn out to be trivial for the purpose at hand (i.e., do not fall into any cluster of interest).

Figure 6:
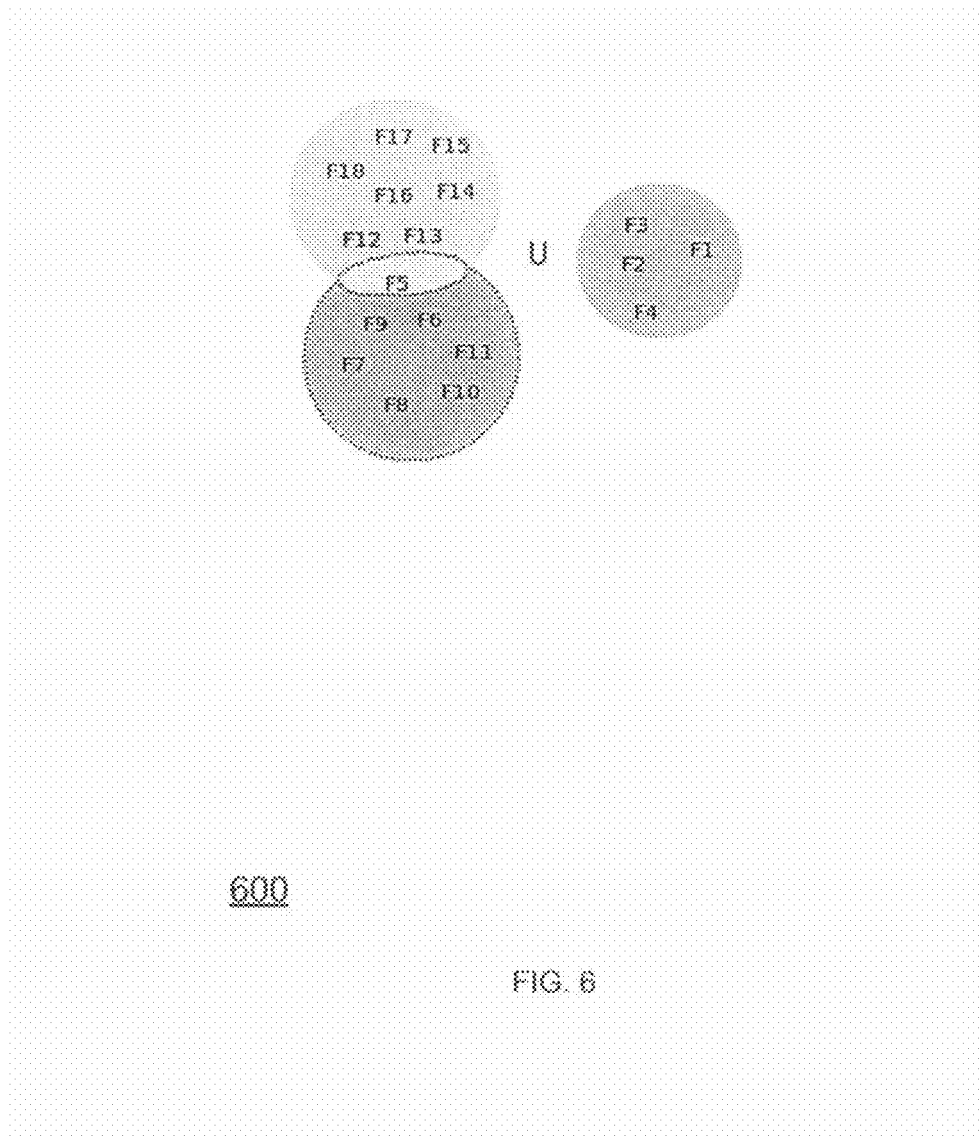
FIG. 6 illustrates the result of soft clustering, in accordance with one embodiment.

Many clustering processes, including HAC, uniquely assign a node to only one cluster at a time. However, for use in applications such as social networking, it may make sense to have certain nodes in multiple clusters. For example, a person may be both a surgeon and an avid football fan. Requiring that person to be clustered in with either other surgeons or with other football fans may lead to suboptimal results in near-neighbor processing. Thus, in step 303, clusters are merged, or "softened," in the following manner. For every node U, and for every cluster C that node U does not belong to, the node is added to that cluster if the similarity of that node to that cluster is above a certain level of similarity. In one embodiment, the same level of similarity is used in step 303 as in prior processing; in alternate embodiments different levels are used. Processing overhead is found to be reduced by taking a node under consideration to be a singleton cluster (i.e., a cluster containing only U) and then performing cluster-to-cluster similarity processing. Specifically, computational overhead is further reduced by processing in accordance with the Lance-Williams update formula, as described, for example, in Tan, et al., INTRODUCTION TO DATA MINING (Addison-Wesley 2006) at p. 524 (Section 8.3.3—The Lance-Williams Formula for Cluster Proximity). FIG. 6 shows the local clusters thus produced from the original clustering shown in FIG. 5. Specifically, primary clusters 5201, 5301, 5302 still exist, but after this "soft" cluster processing, node F5 is determined to belong in both clusters 5301 and 5302.

One aspect of the processing described above is that each processing step involves local, i.e., limited, portions of a social network graph rather than the entire graph: the only information needed to commence processing is information about a user's immediate friends and their immediate friends. As a result, the processing described above is amenable to being widely distributed over multiple processors, such as the various processors referenced above in connection with FIG. 1. Furthermore, processing bottlenecks caused by one portion of processing needing to know the results of another portion of processing are avoided. This characteristic allows for significant parallel processing by, for instance, processors 122, 124 without the significant message passing and other overhead that might otherwise be required.

In step 304, the clusters that are obtained through the above processing are then used by applying them to the social network rules of a social network engine (e.g., social networks 130, 140). For instance, in one embodiment a social network rule suggests new groups to users and new people to existing groups. In another embodiment, sharing of information such as photographs is authorized within certain clusters but not others. In still another, a social network recognizes user activity as relating to a cluster and offers the user with help in doing so more efficiently, such as by offering to share an item with friends from multiple groups. To illustrate, a user may start entering individual user profiles to provide with an invitation; the social network using clustering system 110 may recognize the names being input as relating to two distinct groups, such as a family group and a close friends group, and will in response suggest the full set of these clusters as possible recipients. As can be readily seen from the example of FIG. 6, an advantage of including the soft cluster processing is that a user inviting node F5 can be recognized as potentially showing interest in cluster 5301 or 5302, whereas use of HAC alone would have forced the system to take F5 as pertaining to only one of those (specifically, 5301 based on FIG. 5).

Certain environments may lend themselves to storing certain intermediate processing results for use in subsequent clustering processing. For instance, in massive social networks it may be that large existing clusters are determined often enough to justify keeping such cluster information in data source 110B for future use, rather than recomputing the same information frequently. In step 305, such results are stored for future use. For example, in one embodiment processing for clustering is only performed once each day, with the results being stored for use until the next day's clustering processing takes place.

The present invention has been described in particular detail with respect to various possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not described with reference to any particular programming language. It is appreciated that a variety of programming languages may be used to implement the teachings of the present invention as described herein, and any references to specific languages are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

The invention claimed is:

1. A computer-implemented method comprising:
   determining, using one or more computing devices, a set of first nodes in a social graph of a social network, the first nodes representing users of the social network;
   generating, using the one or more computing devices, a neighbor list including sets of neighboring nodes for each of the first nodes;
   transforming, using the one or more computing devices, the neighbor list to identify trivial neighboring nodes and non-trivial neighboring nodes;
   comparing, using the one or more computing devices, the first nodes that are associated with each of the non-trivial neighboring nodes to produce a similarity matrix; and
   clustering, using the one or more computing devices, similar nodes from set of first nodes using the similarity matrix.

2. The computer-implemented method of claim 1, wherein the trivial neighboring nodes are associated with a single node from among the set of first nodes and the non-trivial neighboring nodes are associated with two or more nodes from among the set of first nodes.

3. The computer-implemented method of claim 1, wherein transforming the neighbor list includes transforming the sets of neighboring nodes into sets that are indexed by neighboring node and that include the first nodes that the neighboring node corresponds to.

4. The computer-implemented method of claim 1, wherein transforming the neighbor list includes converting the neighbor list into an inverted index.

5. The computer-implemented method of claim 1, wherein comparing the first nodes that are associated with each of the non-trivial neighboring nodes to produce the similarity matrix includes determining a number of intersecting first nodes between the sets of neighboring nodes.

6. The computer-implemented method of claim 1, wherein clustering the similar nodes from the set of first nodes using the similarity matrix includes processing the similarity matrix to cluster the first nodes into clusters based on a predetermined similarity metric.

7. The computer-implemented method of claim 6, further comprising merging two or more of the clusters based on a predetermined cluster-to-cluster level of similarity.

8. A computer program product comprising a non-transitory computer-readable medium storing a computer-readable program, wherein the computer-readable program, when executed on a computer, causes the computer to perform operations comprising:
   determining a set of first nodes in a social graph of a social network, the first nodes representing users of the social network;
   generating a neighbor list including sets of neighboring nodes for each of the first nodes;
   transforming the neighbor list to identify trivial neighboring nodes and non-trivial neighboring nodes;
   comparing the first nodes that are associated with each of the non-trivial neighboring nodes to produce a similarity matrix; and
   clustering similar nodes from set of first nodes using the similarity matrix.

9. The computer program product of claim 8, wherein the trivial neighboring nodes are associated with a single node from among the set of first nodes and the non-trivial neighboring nodes are associated with two or more nodes from among the set of first nodes.

10. The computer program product of claim 8, wherein transforming the neighbor list includes transforming the sets of neighboring nodes into sets that are indexed by neighboring node and that include the first nodes that the neighboring node corresponds to.

11. The computer program product of claim 8, wherein transforming the neighbor list includes converting the neighbor list into an inverted index.

12. The computer program product of claim 8, wherein comparing the first nodes that are associated with each of the non-trivial neighboring nodes to produce the similarity matrix includes determining a number of intersecting first nodes between the sets of neighboring nodes.

13. The computer program product of claim 8, wherein clustering the similar nodes from the set of first nodes using the similarity matrix includes processing the similarity matrix to cluster the first nodes into clusters based on a predetermined similarity metric.

14. The computer program product of claim 8, wherein the computer-readable program, when executed on a computer, further causes the computer to perform operations of:
   merging two or more of the clusters based on a predetermined cluster-to-cluster level of similarity.

15. A system comprising:
   one or more processors;
   one or more memories storing instructions that, when executed by the one or more processors, cause the system to perform operations including:
   determining a set of first nodes in a social graph of a social network, the first nodes representing users of the social network;
   generating a neighbor list including sets of neighboring nodes for each of the first nodes;
   transforming the neighbor list to identify trivial neighboring nodes and non-trivial neighboring nodes;
   comparing the first nodes that are associated with each of the non-trivial neighboring nodes to produce a similarity matrix; and
   clustering similar nodes from set of first nodes using the similarity.

16. The system of claim 15, wherein the trivial neighboring nodes are associated with a single node from among the set of first nodes and the non-trivial neighboring nodes are associated with two or more nodes from among the set of first nodes.

17. The system of claim 15, wherein transforming the neighbor list includes transforming the sets of neighboring nodes into sets that are indexed by neighboring node and that include the first nodes that the neighboring node corresponds to.

18. The system of claim 15, wherein transforming the neighbor list includes converting the neighbor list into an inverted index.

19. The system of claim 15, wherein comparing the first nodes that are associated with each of the non-trivial neighboring nodes to produce the similarity matrix includes determining a number of intersecting first nodes between the sets of neighboring nodes.

20. The system of claim 15, wherein clustering the similar nodes from the set of first nodes using the similarity matrix includes processing the similarity matrix to cluster the first nodes into clusters based on a predetermined similarity metric.

21. The system of claim 15, wherein the instructions, when executed by the one or more processors, further cause the system to perform operations including:
    merging two or more of the clusters based on a predetermined cluster-to-cluster level of similarity.

\* \* \* \* \*